United States Patent [19]
Mehta

[11] 3,885,046
[45] May 20, 1975

[54] META CHLORO OR FLUORO SUBSTITUTED ALPHA-T-BUTYLAMINOPROPIOPHE-NONES IN THE TREATMENT OF DEPRESSION

[75] Inventor: Nariman B. Mehta, Raleigh, N.C.

[73] Assignee: Burroughs Wellcome Co., Research Triangle Park, N.C.

[22] Filed: Aug. 23, 1973

[21] Appl. No.: 390,845

Related U.S. Application Data

[62] Division of Ser. No. 93,852, Nov. 30, 1970, Pat. No. 3,819,706.

[30] Foreign Application Priority Data

Dec. 4, 1969 United Kingdom............... 59231/69

[52] U.S. Cl. .............................................. 424/330
[51] Int. Cl. ............................................ A61k 27/00
[58] Field of Search................. 5N/93, 852; 424/330

*Primary Examiner*—Stanley J. Friedman
*Attorney, Agent, or Firm*—Dike, Bronstein, Roberts, Cushman & Pfund

[57] ABSTRACT

The compounds m-chloro-$\alpha$-t-butylaminopropiophenone and m-fluoro-$\alpha$-t-butylaminopropiophenone or salts thereof. The compounds are useful in the treatment of mammals suffering from a depressed state.

14 Claims, No Drawings

META CHLORO OR FLUORO SUBSTITUTED ALPHA-T-BUTYLAMINOPROPIOPHENONES IN THE TREATMENT OF DEPRESSION

This is a division of application Ser. No. 93,852, filed on Nov. 30, 1970, now U.S. Pat. No. 3,819,706.

The present invention relates to α-alkylaminopropiophenones.

It has been found that the two novel compounds represented by the general formula (I)

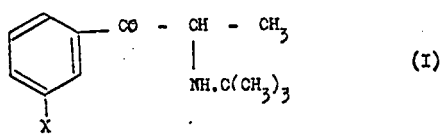

and acid addition salts thereof, in which X is chlorine or fluorine, possess valuable properties as antidepressants when tested by standard techniques used in the art for determining antidepressant activity, for example the tetrabenazine-induced sedation test in rodents. It has been found specifically that the compounds of formula (I) require much larger doses for stimulant action than for antidepressant action. The compounds are also not inhibitors of mono-amine oxidase, nor do they have a pressor effect.

Closely related alkylaminopropiophenones are already known and have been proposed for various pharmaceutical purposes; see for example British Patent Specifications 768,772; 1,011,289; and 1,069,797. The activity of the two novel compounds of the present invention appears to be outstanding and not possessed by related known compounds.

The compounds may be synthesised by the methods known in the art for this type of compound.

A particularly convenient route is that set out in the following reaction scheme:

by the corresponding α-chloro- or α-iodo compounds. m-X-α-Chloropropiophenones may be prepared conveniently by reaction of m-X-propiophenone with sulphuryl chloride. The m-α-dichloropropiophenone may also be conveniently prepared from α-chloropropiophenone by reaction with sulphuryl chloride in the presence of aluminum chloride. The reaction of Step (3) is subject to hindrance and t-butylamine normally reacts very slowly with α-bromopropiophenones. It is desirable to include an organic solvent in the reaction mixture, and for this purpose acetonitrile offers marked advantage. It is a "fast" solvent, is unreactive under the conditions and is relatively low boiling. Other polar solvents, protic or aprotic, may be used, for example lower aliphatic ketones or ethers, but the reaction is slow in these solvents. Others which may be used include dimethylformamide, nitromethane, dimethylsulphoxide and hexamethylphosphoramide.

It is desirable to heat the reactants of Step (3), for example at the reflux temperature of the reaction mixture. The amine is preferably present in excess relative to the ketone; up to five times the equimolar quantity may be used. If the ketone is a m-X-α-chloropropiophenone, then a catalytic amount of an iodide salt, for example iodide, may be included in the reaction mixture.

Once isolated the m-X-α-t-butylaminopropiophenones of formula (I) are stable and can be distilled in vacuo although this is not normally necessary. They are moderately weak bases (pKa around 8.5–9) and are desirably stored and administered as a pharmaceutically acceptable salt, conveniently one of a mineral acid such as the hydrochloride salt. Under physiological conditions, they would be predominantly (but not exclusively) cationic. In any case, if administered as one salt, they would be in equilibrium with the various anions corresponding to other acids present in the body and their salts with different acids can possess advantages only in convenience of

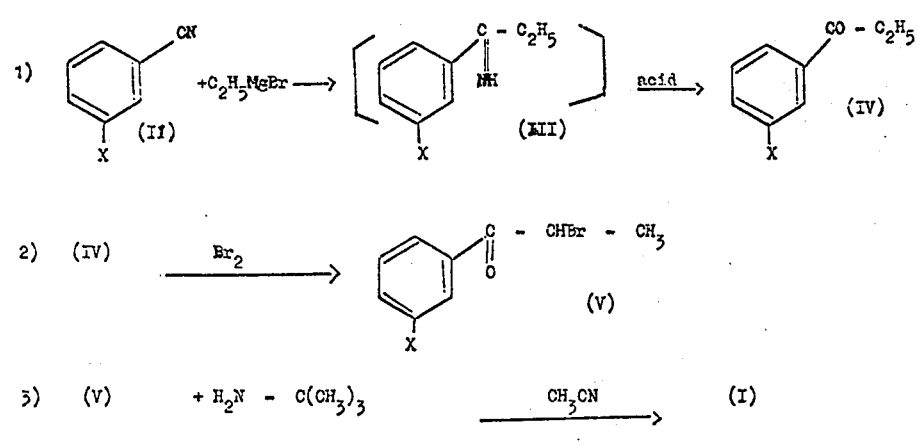

The propiophenones, (IV), are not commercially available, and Step (1) has been found a convenient method of preparation. The bromination Step (2), is not very rapid and may require heating. It is not necessary to isolate the ketone (V) as a pure substance provided the hydrogen bromide produced in Step 2 is removed.

It will of course be understood that in Step (3) above, the m-X-α-bromopropiophenone (V) may be replaced isolation or solubility not in inherent physiological behaviour. Accordingly, it is considered that all salts of the bases of formula (I) with non-toxic acids are equivalent to each other and to the bases.

It will be readily understood that salts of acids which are not pharmaceutically acceptable may also have value as intermediates for the preparation of the acceptable salts by double decomposition, base exchange and other well known methods.

According to the present invention there is provided a compound of the formula (I) and a pharmaceutically accptable salt thereof.

According to the present invention, in yet another aspect, there is provided a pharmaceutical composition (preferably in unit dosage form) comprising a compound of formula (I)(or a pharmaceutically acceptable salt thereof) together with a pharmaceutically acceptable carrier. Conveniently the compound of formula (I) or its acid addition salt comprises from 5 to 95% by weight of the composition.

According to the present invention in yet another aspect there are provided methods of synthesising compounds of formula (I) comprising the application of analogous methods specified above for the preparation of alkylaminopropiophenones.

According to still a further aspect of the present invention, there is provided a method of treating a depressed state in mammals such as humans, mice, rats, etc., which comprises the administration of an antidepressant effective non-toxic amount (dose), preferably in a unit dosage form, of a compound of formula (I) or a pharmaceutically acceptable salt thereof.

The compounds of formula (I) (the active ingredients) or the pharmaceutically acceptable salt thereof is preferably administered in unit dosage form to the mammal being treated.

The compounds of this invention may be administered orally, parenterally or rectally.

A pharmaceutical composition containing a compound of formula (I), or a pharmaceutically acceptable salt thereof, may be presented in discrete units such as tablets, capsules, ampoules or suppositories, each containing an effective antidepressant non-toxic amount of the compound.

The preferred dosage for parenteral administration of a compound of formula (I) (estimated as the base) is about 5 mg/kg to 50 mg/kg of mammal body weight, and the most preferred dosage being 15 mg/kg to 35 mg/kg of mammal body weight.

For the oral or rectal mode of administration, the preferred dosage of a compound of formula (I) (estimated as the base) is about 10 mg/kg to 100 mg/kg of mammal body weight while the most preferred dosage (estimated as the base) is about 30 mg/kg to 70 mg/kg of mammal body weight. A compound of formula (I), or an acid addition salt thereof, is preferably administered four times daily although the number of daily administrations of the medication may vary according to the patient (mammal) being treated, and the exercise of the physician's discretion.

For the treatment of humans, the preferred unit dosage of a compound of formula (I) or an acid addition salt thereof (estimated as the base) for oral administration, or administration as a suppository, is about 15 milligrams to 500 milligrams with the more preferred unit dosage being about 100 milligrams to 300 milligrams, and the most preferred unit dosage being about 125 milligrams to 250 milligrams. All the above doses are given in terms of the weight of a compound of formula (I) in the form of its base, but as will be appreciated from the foregoing information, it is preferably administered in the form of a pharmaceutically acceptable acid addition salt thereof.

A compound of formula (I) or pharmaceutically acceptable salts thereof may be presented as an oral unit preparation (for example as a cachet, tablet or capsule) containing one or more pharmaceutically acceptable carriers which may take the form of solid diluents such as lactose, cornstarch, micronized silica gel, as well as other excipients well known in the art for this purpose.

A compound of formula (I) or a pharmaceutically acceptable salt thereof may be presented for rectal use as a suppository with the usual pharmaceutically acceptable carriers such as cocoa butter, and may be presented for parenteral use as an ampoule of a sterile solution or suspension with water or other pharmaceutically acceptable liquid as the carrier therefor, or as an ampoule of a sterile powder for dilution with a pharmaceutically acceptable liquid.

It should be understood that in addition to the aforementioned ingredients, the pharmaceutical compositions of this invention may include one or more of additional ingredients such as diluents, buffers, flavouring agents, binders, surface active agents, thickeners, lubricants, preservatives, and the like. The formulations may be prepared by admixture of the ingredients, and, if necessary, shaping the resulting mass, and filling into suitable containers.

The compound of formula I is preferably presented for use in the treatment of depressed states as a pharmaceutically acceptable salt. Examples of some of the pharmaceutically acceptable salts which can be utilized are salts of the following acids: hydrochloric, sulfuric, phosphoric and toluenesulphonic.

The invention will not be illustrated with reference to the following examples:

EXAMPLE 1

Preparation of m-Chloro-α-t-butylaminopropiophenone a. m-Chloropropiophenone

To ethyl magnesium bromide (2 l.; 3M) was added over 45 minutes with stirring and cooling m-chlorobenzonitrile (688 gm.; 5 mole) in ether (2.5 l.). The resultant solution was heated under gentle reflux for 5 hours.

The reaction-mixture was hydrolyzed with cold dilute hydrochloric acid, the ether was distilled off, and the aqueous solution was heated at 90°C. for one hour. The flask was then cooled and seeded. The solid ketone that separated was washed with cold water and recrystallized from methanol. The recrystallized ketone, m.p. 39°–40°, weighed 750 gm.

b. m-Chloro-α-bromopropiophenone

In methylene chloride (3 l.) was dissolved m-chloropropiophenone (698 gm.; 4.15 mole). The solution was stirred with charcoal (Darco) and magnesium sulfate for two hours and filtered. To it was added with stirring 662 grams (4.15 mole – 2 g.) of bromine in methylene chloride (1 l.). When the bromine colour had faded completely, the solvent was evaporated in vacuo.

c. M-Chloro-α-t-butylaminopropiophenone hydrochloride

The oily residue obtained in the manner of paragraph (b) was dissolved in acetonitrile (1300 ml.). To this, t-butylamine (733 gm.) in acetonitrile (1300 ml.) was added while keeping the temperature below 32°C. The reaction mixture was allowed to stand over-night. It was then partitioned between water (4200 ml.) and ether (2700 ml.). The aqueous layer was extracted with a further portion of ether (1300 ml.). The combined ethereal layers were then washed with water (4200 ml.) to which hydrochloric acid was added until the pH of the aqueous layer was 9. The aqueous layer was separated and washed with ether (500 ml.) and then discarded. The combined ethereal layers were then stirred with ice (560 gm.) and concentrated hydrochloric acid (324 ml.). The ethereal layer was separated and again washed with water (200 ml.) and concentrated hydrochloric acid (50 ml.). These last two acid layers are combined and concentrated in vacuo until crystals appeared. The solution was then chilled to 5°C and filtered. The product was sucked dry, washed with acetone and recrystallized from a mixture of isopropanol (3l.) and absolute ethanol (800 ml.). The DL-m-chloro-α-t-butylaminopropiophenone hydrochloride so obtained was analytically and spectrographically pure, m.p. 233°–234°C.

EXAMPLE 2

Preparation of m-Fluoro-α-t-butylaminopropiophenone a. m-Fluoropropiophenone

Ethyl magnesium bromide was reacted with m-fluorobenzonitrile by the procedure of Example 1(a). The ketone boils at 89°C at 8mm pressure and melts at 29°–30°C.

b. m-Fluoro-α-t-butylaminopropiophenone hydrochloride

The bromination of the product described in paragraph 2(a) was conducted as described in Example 1(b), and reaction of the α-bromoketone with t-butylamine as described in Example 1(c). The DL-aminoketone hydrochloride melted at 225°–226°C.

While in the process of Example 1 and 2, the hydrochlorides were obtained directly without isolation of the bases, it is also feasible to separate the bases by vacuum distillation. m-Chloro-α-t-butylaminopropiophenone was distilled at 52°C and 5μ (0.005mm.) Hg pressure. The m-fluoro analogue was distilled at 44–48°C and 40μ (0.04mm) Hg pressure.

EXAMPLE 3

Tablet Formulation 300 mg Tablet Ingredients
150 mg. of a hydrochloride salt of formula (I)
85 mg. Lactose
50 mg. Cornstarch
10 mg. Micronized Silica Gel
5 mg. Polyvinyl pyrrolidone
Procedure The lactose, cornstarch and salt were mixed together and granulated with a binder, polyvinyl pyrrolidone in alcoholic solution, to form granules. The granules were passed through a 16 – 20 mesh screen, then air dried, lubricated with micronized silica gel and compressed into tablets. A film coating could then have applied if desired.

EXAMPLE 4

Capsule Formulation 400 mg. Fill Weight 150 mg. of a hydrochloride salt of a compound of formula (I) were mixed with 125 mg. of lactose and 125 mg. of cornstarch. The mixture was filled into a two piece hard gelatin capsule.

EXAMPLE 5

Parenteral Solution 150 mg. of a hydrochloride salt of formula (I) was dissolved in sterile water U.S.P. to make 1 ml. A multi-dose preparation may include bacteriostats such as 0.2 to 0.5% w/v of phenol.

EXAMPLE 6

Suppository of 400 mg. Weight 150 mg. of a hydrochloride salt of formula (I) were mixed with 250 mg. of softened or melted cocoa butter, and suppositories were formed by chilling and shaping in moulds.

What we claim is:

1. A pharmaceutical composition suitable for use in the treatment of the depressed state comprising an antidepressant-effective amount of a compound of the general formula

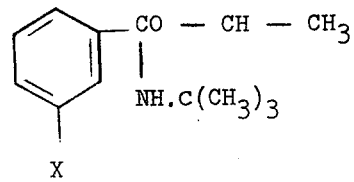

wherein X is chlorine or a pharmaceutically acceptable acid addition salt thereof and a pharmaceutically acceptable carrier therefor.

2. A composition as claimed in claim 1 wherein the compound or its acid addition salt thereof is present as 5 to 95% by weight of the composition.

3. A composition as claimed in claim 1 suitable for oral or rectal administration and in the form of a discrete dosage unit containing from 15 to 500 milligram of the compound or a pharmaceutically acceptable acid addition salt thereof calculated as the weight of base present in the composition.

4. A composition as claimed in claim 1 suitable for parenteral administration in the form of a discrete dosage unit containing from 7.5 to 250 milligram of the compound or a pharmaceutically acceptable acid addition salt thereof, calculated as the weight of base in the composition.

5. A tablet suitable for oral administration comprising an antidepressant-effective amount of m-chloro-α-t-butylaminopropiophenone or m-fluoro-α-t-butylaminopropiophenone or a pharmaceutically acceptable acid addition salt thereof and a pharmaceutically acceptable carrier.

6. A capsule suitable for oral administration containing an antidepressant-effective amount of m-chloro-α-t-butylaminopropiophenone or m-fluoro-α-t-butylaminopropiophenone or a pharmaceutically acceptable acid addition salt thereof and a pharmaceutically acceptable carrier.

7. A sterile solution or suspension suitable for parenteral administration comprising an antidepressant-effective amount of m-chloro-α-t-butylaminopropiophenone or m-fluoro-α-t-butylaminopropiophenone or a pharmaceutically acceptable acid addition salt thereof and a pharmaceutically acceptable carrier.

8. A tablet suitable for oral administration comprising 15 to 500 milligram of m-chloro-α-t- butylaminopropiophenone hydrochloride and a pharmaceutically acceptable carrier.

9. A method of treating a depressed state in mammals which comprises the administration of an effective antidepressive dose to a mammal of a compound of the formula

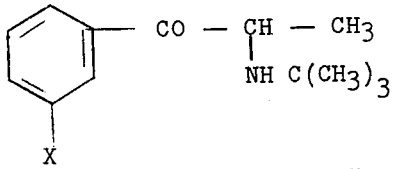

wherein X is chlorine or a pharmaceutically acceptable acid addition salt thereof and a pharmaceutically acceptable carrier.

10. A method as claimed in claim 9 comprising the oral or rectal administration of a dose of 10 to 100 milligram per killogram body weight or the mammal, said dose calculated as the base.

11. A method as claimed in claim 9 comprising the parenteral administration of a dose of 5 to 50 milligram per killogram body weight of the mammal, said dose calculated as the base.

12. A method as claimed in claim 9 comprising the administration to a human of an effective-antidepressant dose of m-chloro-α-t-butylaminopropiophenone hydrochloride.

13. A method according to claim 10 wherein the mammel is a human.

14. A method according to claim 11 wherein the mammal is a human.

* * * * *

UNITED STATES PATENT OFFICE
CERTIFICATE OF CORRECTION

PATENT NO. : 3,885,046
DATED : MAY 20, 1975
INVENTOR(S) : NARIMAN B. MEHTA

It is certified that error appears in the above-identified patent and that said Letters Patent are hereby corrected as shown below:

Column 6, claim 1, line 4, cancel the formula

"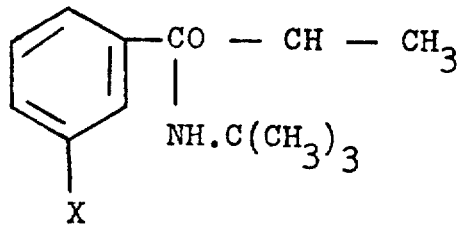"  and insert the following formula therefor: -----

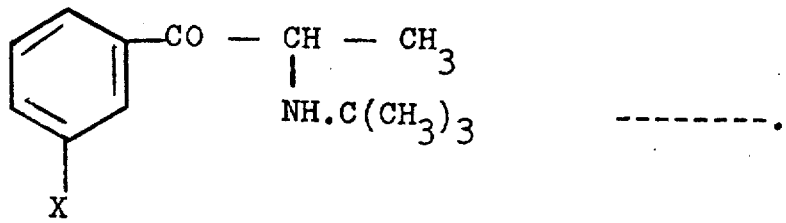 --------.

[SEAL]

Signed and Sealed this twenty-first Day of October 1975

Attest:

RUTH C. MASON
*Attesting Officer*

C. MARSHALL DANN
*Commissioner of Patents and Trademarks*

UNITED STATES PATENT AND TRADEMARK OFFICE

CERTIFICATE EXTENDING PATENT TERM
UNDER 35 U.S.C. 156

Patent No.    : 3,885,046

Dated         : May 20, 1975

Inventor(s)   : Nariman B. Mehta

Patent Owner  : Burroughs Wellcome Co.

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Nineteenth day of December 1986.

Donald J. Quigg

Assistant Secretary and Commissioner of Patents and Trademarks